Dec. 26, 1961    E. HITZELBERGER    3,014,716
WINDOW ACTUATING MECHANISM
Filed Oct. 21, 1957    2 Sheets-Sheet 1
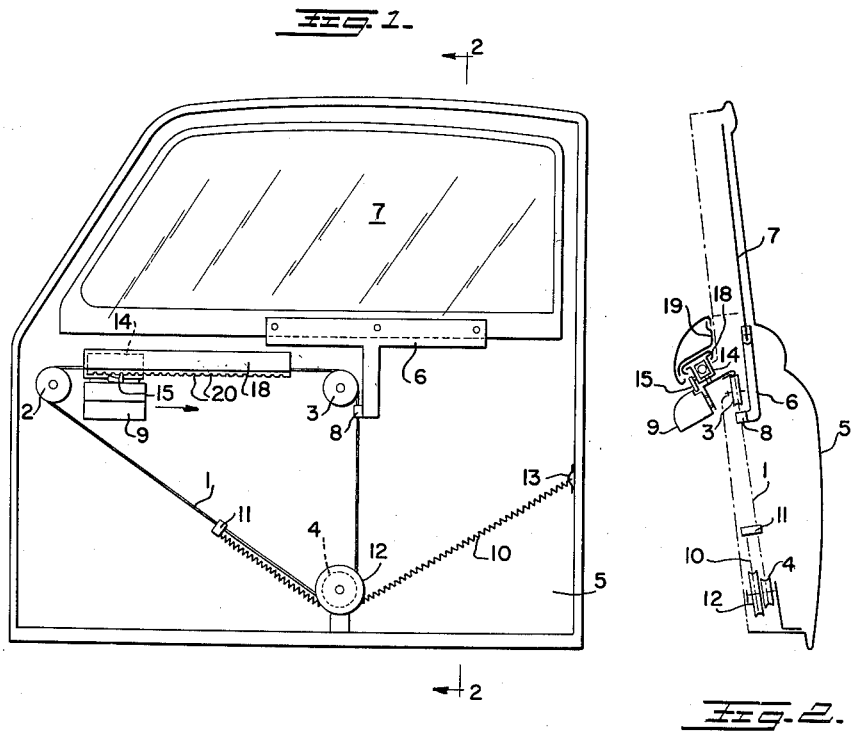
Fig. 1.
Fig. 2.
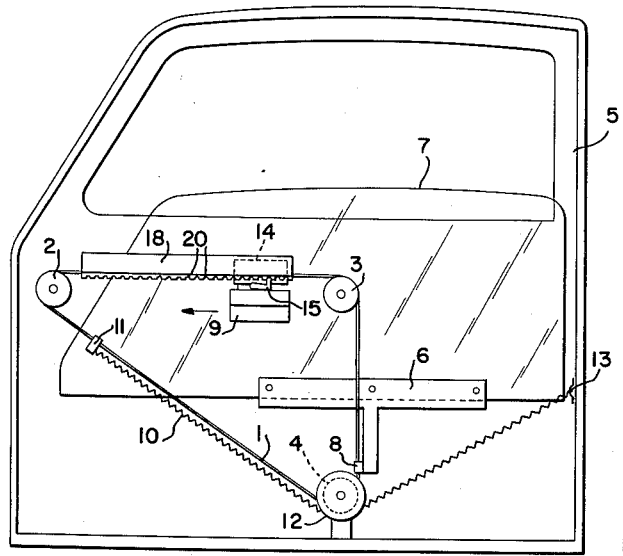
Fig. 3.
INVENTOR
ERWIN HITZELBERGER
BY Dicke and Bray
ATTORNEYS

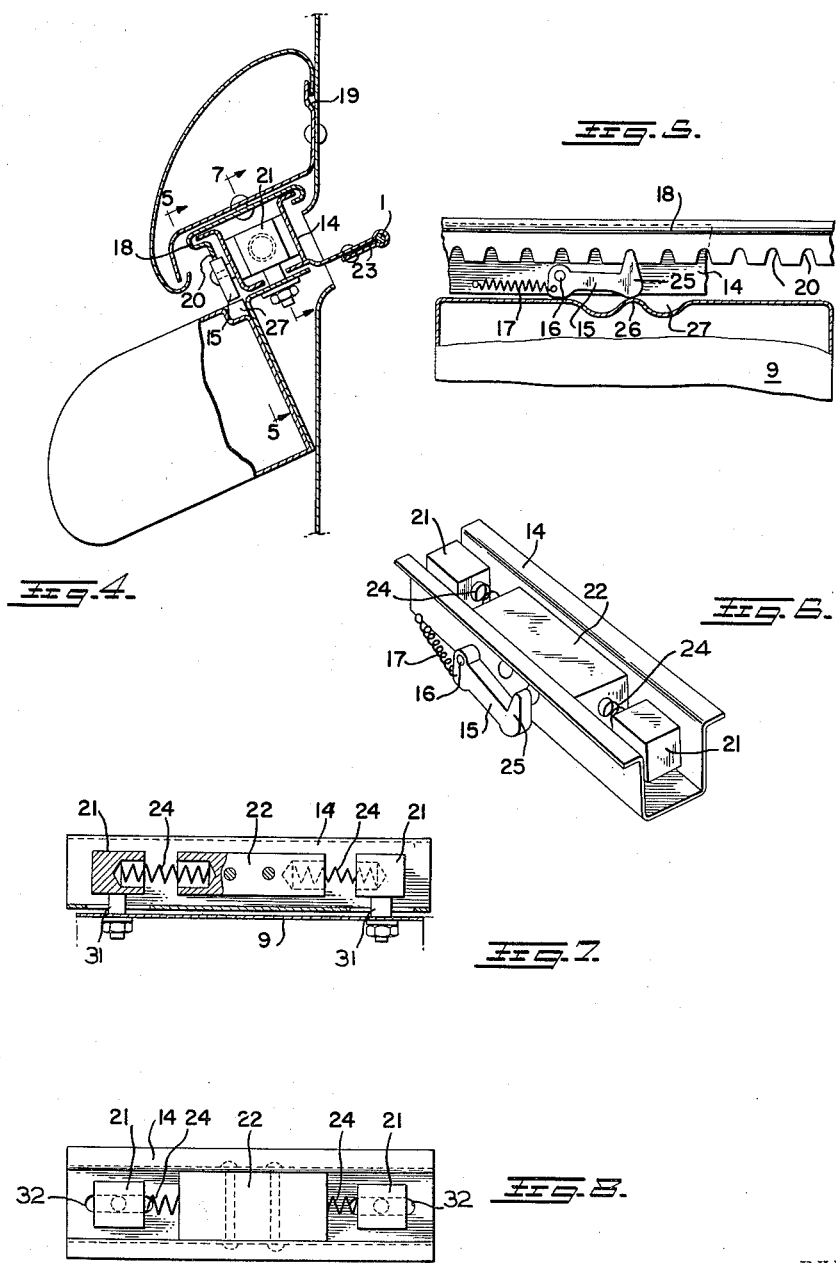

United States Patent Office 3,014,716
Patented Dec. 26, 1961

3,014,716
WINDOW ACTUATING MECHANISM
Erwin Hitzelberger, Stuttgart-Rohr, Germany, assignor to Daimler-Benz Aktiengesellschaft, Stuttgart-Unterturkheim, Germany
Filed Oct. 21, 1957, Ser. No. 691,462
19 Claims. (Cl. 268—128)

The present invention relates to a novel and improved window actuating mechanism, and more particularly to a mechanism for opening and closing windows, especially of motor vehicles, by means of an actuating member displaceable essentially linearly and in which the window may securely be held or locked in any desired position.

The present invention has as one of its main objects the provision of a novel, simple and reliable arrangement for opening and closing windows particularly in motor vehicles whereby locking of the window pane is to be rendered possible in every position thereof.

In motor vehicles, the window panes disposed in the vehicle doors are usually arranged to be movable or slidable in the vertical direction so that in the opened condition the window is lowered either completely or partially into the vehicle door. For carrying out this lowering movement, the window panes are usually supported in appropriate guide means and are usually secured at the lower end thereof with a displacement member which is operatively connected with a crank drive. By rotating the crank the displacement member is displaced in a downward direction and thereby takes along behind it the window pane to be opened. Even though such crank drive is usually provided with a reduction gear, nevertheless, it happens oftentimes that the crank can be actuated only with relatively great difficulty. Oftentimes, the guide means as well as the crank drive means becomes dirty whereby the friction is increased and the installation offers a considerable resistance to the opening or closing of the window. Furthermore, in order to prevent unauthorized access with a partially opened window, the reduction gear itself must be constructed in a self-locking manner. As a result thereof, ordinarily relatively many rotations of the crank are necessary until the window pane is brought from its uppermost, closed position into the lowermost, fully opened position thereof. Consequently, opening or closing of the window takes place only relatively slowly. Moreover, the execution of the required rotary movements for the crank oftentimes is inconvenient, especially when the vehicle is fully occupied.

The present invention aims at eliminating all of the aforementioned disadvantages and proposes to render the window pane lowerable by means of a cable or line. The movement of the window pane from the uppermost to the lowermost position thereof may be realized, for example, by means of a handle in a single movement, for instance, in the horizontal direction.

The arrangement in accordance with the present invention consists of an endless cable or line disposed in the interior of the vehicle door which is guided, for example, over three rollers in such a manner that a portion of the line extends in the horizontal direction, another portion thereof in the vertical direction, and still another portion thereof in an inclined direction. A handle is arranged at the horizontally extending portion of the cable whereas the window displacement member is secured at the vertically disposed cable portion. The window pane itself is operatively connected with the displacement member. A draw-spring, rubber band, or the like is secured to the remaining inclined portion of the cable or line, the other end of the spring being secured, after passing over one of the guide rollers, at the wall part of the door which is opposite to that to which the cable or line is secured. The spring or rubber band serves the purpose of equalizing the weight of the window pane in every position so that during actuation of the mechanism only the friction must be overcome.

Appropriately, the window actuating handle may also be formed to constitute an ash tray.

Since such a window actuating mechanism as proposed by the present invention, unlike a crank drive, cannot be constructed self-lockingly, and since it is necessary to lock the window pane in any desired position, for example, by reason of vibrations and shocks which may occur during travel, a locking mechanism is provided in accordance with the present invention, which will be described more fully hereinafter and the salient features of which are as follows:

The handle is operatively connected with the horizontal portion of the cable or line by means of a connecting part as already mentioned hereinabove. A guide means is simultaneously provided at this connecting part and additionally a locking pawl or the like is provided thereat which is pivotally secured to the guide means. The handle itself is movably arranged within limits with respect to the aforementioned guide means and is retained in a center position by two springs if no force is exerted thereon in either direction. In the center position of the handle, a cam operatively connected therewith presses against the head of the locking pawl also secured to the guide means and therewith brings the locking or nose portion thereof into engagement with a stationary detent or notch means of a rack member. If the window pane is now to be raised or lowered, then at first a force is exerted on the handle which is effective against the force of the draw or compression spring by means of which the handle is displaced slightly relative to the guide means thereof by a predetermined amount up to an abutment or stop member. The cam is displaced below the locking pawl simultaneously with this displacement of the handle and thereby renders the locking pawl free which is disengaged from the locking position thereof by a weak spring. As a result thereof, the locking of the window pane is released before the force becomes effective on the cable or line and therewith on the window actuating movement. After termination of the window actuation and upon releasing the handle, the handle is again brought into the center position thereof by the centering springs and the locking pawl is again brought into the engaging position with the notches by the cam in the center position of the handle. The movement of the window pane always occurs only after the handle has come into abutment with the stop member and is thereupon further actuated.

Accordingly, it is an object of the present invention to provide a window actuating mechanism which obviates the disadvantages of the prior art.

It is still another object of the present invention to provide a window actuating mechanism which obviates the need for rotary movement of a crank and which instead utilizes an essentially rectilinear movement of a handle to produce raising or lowering of the window pane.

Still another object of the present invention resides in the provision of a window actuating mechanism by means of a handle moving linearly and particularly horizontally, which produces a locking of the window pane in any desired position.

A still further object of the present invention resides in the provision of a window actuating mechanism which facilitates raising and lowering of the window and which minimizes any friction which may occur.

These and further objects, features and advantages of the present invention will become more obvious from the following description when taken in connection with the accompanying drawing which shows, for purposes of illustration only, one embodiment in accordance with the present invention, and wherein:

FIGURE 1 is a longitudinal cross-sectional view through a vehicle door provided with a window actuating mechanism in accordance with the present invention with the window pane essentially in the closed position thereof;

FIGURE 2 is a cross-sectional view taken along line 2—2 of FIGURE 1;

FIGURE 3 is a cross-sectional view similar to FIGURE 1 through the vehicle door showing the window essentially in the open position thereof;

FIGURE 4 is an enlarged cross-sectional view through the locking mechanism in accordance with the present invention for the window;

FIGURE 5 is a cross-sectional view taken along line 5—5 of FIGURE 4;

FIGURE 6 is a perspective view of the guide means for the locking mechanism in accordance with the present invention;

FIGURE 7 is a cross-sectional view taken along line 7—7 of FIGURE 4 showing the guide arrangement with the handle in accordance with the present invention, and FIGURE 8 is a plan view of the guide arrangement illustrated in FIGURE 7.

Referring now to the drawing wherein like reference numerals are used throughout the various views to designate like parts, and more particularly to FIGURES 1, 2 and 3, reference numeral 1 designates the line or cable such as a cable or wire rope which is guided over the guide rollers 2, 3 and 4 suitably arranged and secured within the interior of the vehicle door 5 below the window aperture thereof. The guide rollers 2 and 3 are arranged at approximately the same height, i.e., in the same horizontal plane, whereas the guide roller 4 is arranged below the two guide rollers 2 and 3 in proximity to the door center. As a result of this arrangement of the guide rollers 2, 3 and 4, the endless cable wire 1 includes a horizontal portion, a vertical portion, and an inclined portion. The window pane 7 is suitably secured at the essentially T-shaped connecting member 6 constituting the displacement member for the window pane. The connecting member 6 includes a downwardly and inwardly bent extension 8 by means of which it is secured at the vertically extending portion of the endless cable 1 in any suitable manner. The handle 9 is secured to the horizontally extending portion of the cable 1 whereas the spring-like tensioning member or draw spring 10 which equalizes the weight of the window pane 7 is secured at the inclined portion of the rope or cable by means of a suitable clamping device. The spring 10 acts with a force upon the rope or cable 1 tending to carry at least part of the weight of the window to tend to counterbalance the latter.

In the closed position of the window 7 shown in FIGURE 1, the handle 9 is at the extreme left position thereof. At the same time, the extension 8 by means of which the displacement member 6 is secured to the cable 1 is in the uppermost position at the vertical portion of the cable 1. If the handle 9 is now displaced toward the right, as viewed in FIGURES 1 or 2, then the point 8 is displaced downwardly by the cable 1 whereby the window pane 7 is simultaneously opened. The point 11 at which the one end of the tension spring 10 is secured to the inclined portion of the cable 1 thereby moves to the left in an upwardly inclined direction whereby the spring 10 is more and more tensioned, and simultaneously therewith the spring 10 is also further drawn apart toward the left by the rotation of the spring roller 12 mounted coaxially with roller 4. The spring 10 is secured with the right end thereof at the vehicle wall at point 13 which is opposite to the connecting place 11 of the spring 10 with the inclined cable portion.

The locking mechanism for holding the window pane in any desired position consists of the handle 9 which is connected with the horizontal portions of the cable 1 by a connecting member 14, the exact configuration of which appears more clearly from FIGURES 4–6. The locking pawl 15 is pivotally secured by means of a pin 16 at the connecting member 14. The locking pawl 15 is normally held in the non-engaging position thereof by the spring 17 which is relatively weak. The connecting member 14 includes an inverted hat-shaped channel member simultaneously constituting guide means which slides in the guide rail member 18 secured to the door wall 5 by means of the sheet-metal connecting member 19. The guide rail member 18 is provided on one side thereof with a toothed arrangement or rack 20 into which the locking pawl 15 engages upon release of handle 9. Lost motion of the handle 9 relative to the member 14 is provided and the handle is biased to a central position relative to member 14 by springs 24 confined between two stop members 21 and a center piece 22. The two lateral abutment or stop members 21 (FIGURES 4 and 6–8) which are movably accommodated within the channel member 14, are suitably secured to the handle 9, for example, by bolted connections 31 extending through elongated slots 32 provided in channel member 14, as shown in FIGURES 7 and 8, whereas the center piece 22 is rigidly connected with the connecting piece 14 in any suitable manner and is directly connected with the cable 1 by means of clamp 23.

*Operation*

As long as no force is exerted on the handle 9, the springs 24 retain the center piece 22 and therewith the handle 9 in the center position thereof relative to member 14. A cam 26 is provided at the handle 9 itself below the head 25 of the locking pawl 15 by means of which the locking pawl 15 is forced into the notches or teeth 20 of the toothed arrangement provided at the guide rail member 18 with the handle 9 in the center position thereof. If the handle 9 is actuated, then one of the two springs 24 is at first compressed until one of the abutment members 21 comes into abutment with the center piece 22. As a result of such movement, the slight recess 27 in the handle 9 comes to lie below the head 25 of the locking pawl 15 whereby the locking pawl 15 is disengaged by means of the spring 17 from engagement thereof with notch or tooth 20. Only thereafter, i.e., only after an abutment member 21 comes into contact with the center piece 22, a force is exerted on the cable 1 by the clamp 23 upon continued movement of handle 9, whereby the cable 1 is displaced in the one or the other direction and the window is either opened or closed thereby.

The window actuating handle such as seen in FIGURE 4 projects from an inner wall of the vehicle body structure so that it is accessible from above and its configuration may be such that it constitutes an ash tray. While I have shown and described one preferred embodiment in accordance with the present invention, it is understood that the same is not limited thereto but is susceptible of many changes and modifications within the spirit of the present invention, and I intend to cover all such changes and modifications.

I claim:

1. An arrangement for opening and closing windows disposed in a relatively stationary part comprising endless cable means rotatably mounted at said relatively stationary part, a window, a handle, and means operatively connecting said handle with said cable means and said cable means with said window to selectively produce opening and closing movement of said window by displacement of said handle, three rollers mounted on said stationary part for rotatably supporting thereon said cable means, said three rollers being so disposed as to form by said cable means a triangle with an essentially right angle and having an essentially horizontal portion connected with said handle, an essentially vertical portion connected with said window, and an inclined portion, and means secured to said inclined portion for counteracting the weight of said window.

2. An arrangement for opening and closing windows according to claim 1, wherein said counteracting means includes yieldable means, and further comprising roller means coaxial with the lowermost one of said rollers for supporting thereon said yieldable means, said yieldable means being connected with one end thereof to said inclined portion and with the other end thereof to said relatively stationary part on the opposite side of said roller means.

3. An arrangement for opening and closing windows according to claim 2, further comprising means for automatically locking said window in any desired position, and lost-motion means operatively connecting said handle to said locking means and providing linear lost motion of said handle in opposite directions relative to said locking means for automatically disabling said locking means, said handle being movable in either direction to disable said locking means and being further movable in the same direction to displace said window.

4. An arrangement for opening and closing windows disposed in a relatively stationary part comprising endless cable means rotatably mounted at said relatively stationary part, a window operatively connected with said cable means, a handle, and means operatively connecting said handle with said cable means to selectively produce opening and closing movement of said window by displacement of said handle including means for locking said window in any desired position, said connecting means including lost motion means for providing linear lost motion of said handle in opposite directions relative to said locking means for automatically releasing said locking means upon movement of said handle by a predetermined amount, said handle being further movable in the same direction upon releasing said locking means to displace said window.

5. A window opening and closing arrangement according to claim 1 wherein said relatively stationary part defines an inner wall of the vehicle body structure and said handle projects from said wall structure so as to be accessible from above, said handle constituting an ash tray movable horizontally along said wall structure.

6. An arrangement for opening and closing windows disposed in a relatively stationary part comprising endless cable means rotatably mounted at said relatively stationary part, a window operatively connected with said cable means, a handle, means operatively connecting said handle with said cable means to selectively produce opening and closing movement of said window by displacement of said handle including means for locking said window in any desired position, said locking means including guide means secured to said relatively stationary part and provided with notch means, said connecting means including a member slidably guided in said guide means, pawl means pivotally mounted on said slidable member and cooperating with said notch means, spring means for disengaging said pawl means from said notch means, and cam means on said handle cooperating with said pawl means to overcome the effect of said spring means and thereby produce locking of said window.

7. An arrangement for opening and closing windows according to claim 6 further comprising a lost-motion connection between said handle and said slidable member.

8. An arrangement for selectively opening and closing a window disposed in a relatively stationary part by means of a handle, comprising a handle, means for mounting said handle on said relatively stationary part including means for constraining said handle to essentially only linear movement, actuating means operatively connecting said window with said handle for selectively opening and closing said window by said handle including handle actuated locking means to secure said window in any desired position, said locking means including disengageable means to prevent movement of said window in either the opening or closing direction upon engagement of said disengageable means, said two engageable means cooperating with said handle for actuation thereby into disengagement by said linear movement of the handle, said actuating means being connected to move said window solely in response to said linear movement of the handle, and means for biasing said disengageable means into the position of engagement.

9. An arrangement for selectively opening and closing a window disposed in a relatively stationary part by means of a handle adapted to be displaced in a fixed path, comprising means for mounting said handle on said stationary part for movement relative thereto and including means for constraining said handle to movement in only one mode in said fixed path, actuating means operatively connecting said window with said handle to selectively open and close said window by said handle including means to secure said window in any desired position, said last-mentioned means including disengageable means to prevent movement of said window in either the opening or closing directions upon engagement of said disengageable means, and lost-motion means between said handle and said actuating means for initially providing lost motion between said handle and said actuating means to automatically disengage said disengageable means before selectively opening or closing said window by displacing said actuating means.

10. An arrangement for selectively opening and closing a window according to claim 9, wherein said handle is displaceable only essentially linearly.

11. An arrangement for selectively opening and closing a window according to claim 9, wherein said actuating means includes an endless wire cable, and further including spring means connected to said wire cable to exert a force on said cable tending to carry at least part of the weight of the window to tend to counterbalance the latter, said window being arranged for generally vertical movement.

12. An arrangement for selectively opening and closing a window disposed in a relatively stationary part by means of a handle adapted to be displaced, comprising means for mounting said handle on said relatively stationary part for movement relative thereto, actuating means operatively connecting said window with said handle and means to secure said window in any desired position, said last-mentioned means including elongated guide means secured to said relatively stationary part, channel means operatively connected with said handle and confined to longitudinal movement of said guide means by said guide means, disengageable locking means between said guide means and said channel means, said locking means including a stationary detent in fixed relationship with respect to said stationary part and said guide means and a movable pawl carried by said channel means and engageable with said detent and means for initially providing lost motion between said handle and said channel means to automatically disengage said pawl from said detent to disengage said locking means before moving said channel means by said handle to thereby move said window.

13. An arrangement for selectively opening and closing a window according to claim 12, wherein said relatively stationary part is part of a motor vehicle door, and wherein said handle is displaceable only linearly along the inside of said vehicle door during said lost motion.

14. An arrangement for opening and closing windows in motor vehicles having a relatively stationary wall part, comprising an endless cable, means for rotatably mounting said endless cable at said relatively stationary part to provide at least three cable portions disposed at an angle to each other, a window adapted to be displaced for opening and closing thereof, one of said cable portions extending essentially in the direction of said opening and closing movement, a handle, means for mounting said handle at said relatively stationary part to enable only linear displacement thereof, the direction of said linear displacement essentially coinciding with the direction of another cable portion, means for operatively connecting said window with said one cable portion, means including an elastic element interconnecting said cable and said stationary wall part to exert a force on said cable tending to carry at least part of the weight of the window to tend to counterbalance the latter means for operatively connecting said handle with said another cable portion including locking means to hold said handle in any desired position and therewith secure said window in any desired position, said locking means being releasable by manipulation of said handle.

15. An arrangement for opening and closing windows according to claim 14, wherein said locking means includes detent means, pawl means adapted to cooperate with said detent means, means normally producing disengagement of said pawl means, and means forming part of said handle to produce engagement of said pawl means with said detent means.

16. An arrangement for opening and closing windows according to claim 14, wherein said last-mentioned connecting means includes lost-motion connecting means between said handle and said locking means to automatically disengage said locking means prior to actual displacement of said window, said handle being movable initially in one direction to disengage the locking means and movable further in said direction to displace said window.

17. An actuating arrangement for opening and closing an automobile window comprising an actuating handle, a movable structure connected to move said window, lost motion means connecting said handle and said structure and providing a limited range of lost motion therebetween, spring means biasing said handle relative said structure to a central position in said range, a stationary structure comprising a rack, a pawl supported by said movable structure and engageable with said rack to lock said movable structure in any of a plurality of different positions, and a cam on said handle engageable with said pawl when said handle is in said central position to lock said pawl in engagement with said rack, means for releasing said pawl from locking engagement in response to lost motion of said handle relative to said movable structure, and abutment means on said movable structure engageable by said handle after release of said pawl by said lost motion to move said window.

18. The combination according to claim 17, comprising a spring for biasing said pawl toward a disengaged position relative to said rack.

19. An arrangement for opening and closing windows in motor vehicles having a relatively stationary wall part, comprising an endless cable, means for rotatably mounting said endless cable at said relatively stationary part to provide at least three cable portions disposed at an angle to each other, a window adapted to be displaced vertically for opening and closing movement thereof, one of said cable portions extending essentially in the direction of said opening and closing movement, means for connecting said one cable portion to said window, means connected to said cable for moving the latter along its length to displace said window vertically, an elongated tensioned elastic member having one end secured to said stationary wall part and its other end secured to a portion of said cable for urging the latter by the tension of said member in the direction to counteract the weight of said window, means for engaging said elastic member intermediate its ends for changing the direction of the tensional forces therein, the portion of said elastic member between said last-mentioned means and the end secured to said cable being generally parallel to the portion of the cable to which said end is secured and the portion of said elastic member between said last-mentioned means and the end secured to said stationary wall part being substantially inclined with respect to the direction of said first-mentioned portion of the elastic member.

References Cited in the file of this patent

UNITED STATES PATENTS

| | | |
|---|---|---|
| 803,495 | Lund | Oct. 31, 1905 |
| 2,839,331 | Smith | June 17, 1958 |

FOREIGN PATENTS

| | | |
|---|---|---|
| 672,126 | France | Sept. 14, 1929 |
| 328,796 | Great Britain | May 8, 1930 |
| 471,044 | Great Britain | Aug. 26, 1937 |
| 570,156 | Great Britain | June 25, 1945 |
| 1,089,485 | France | Sept. 29, 1954 |